US012741287B2

(12) United States Patent
Blaire et al.

(10) Patent No.: US 12,741,287 B2
(45) Date of Patent: Sep. 22, 2026

(54) MEMBRANE FOR COLLECTING AIRBORNE PARTICLES

(71) Applicant: Commissariat à l'Energie Atomique et aux Energies Alternatives, Paris (FR)

(72) Inventors: Guillaume Blaire, Grenoble Cedex (FR); Manuel Alessio, Grenoble Cedex (FR); Mélissa Baque, Grenoble Cedex (FR); Jean-Maxime Roux, Grenoble Cedex (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 796 days.

(21) Appl. No.: 18/064,986

(22) Filed: Dec. 13, 2022

(65) Prior Publication Data

US 2023/0191426 A1 Jun. 22, 2023

(30) Foreign Application Priority Data

Dec. 17, 2021 (FR) ...................................... 21 13751

(51) Int. Cl.
*B03C 3/64* (2006.01)
*B03C 3/08* (2006.01)
*B03C 3/16* (2006.01)
*B03C 3/47* (2006.01)

(52) U.S. Cl.
CPC .................. *B03C 3/64* (2013.01); *B03C 3/08* (2013.01); *B03C 3/16* (2013.01); *B03C 3/47* (2013.01)

(58) Field of Classification Search
None
See application file for complete search history.

(56) References Cited

U.S. PATENT DOCUMENTS 6,207,369 B1 * 3/2001 Wohlstadter ........... G01N 21/66 436/805
6,231,643 B1 * 5/2001 Pasic ......................... B03C 3/76 96/36

(Continued)

FOREIGN PATENT DOCUMENTS

CN 106164670 B * 6/2019 ........... G01N 33/539
EP 1 814 137 A2 8/2007

(Continued)

OTHER PUBLICATIONS

French Preliminary Search Report and Written Opinion Issued Aug. 11, 2022 in French Application 21 13751 filed on Dec. 17, 2021 (with English Translation of Categories of Cited Documents), 10 pages.

*Primary Examiner* — Jennifer Dieterle
*Assistant Examiner* — Sonji Turner
(74) *Attorney, Agent, or Firm* — Oblon, McClelland, Maier & Neustadt, L.L.P.

(57) ABSTRACT

A membrane for collecting airborne particles, the membrane taking the form of a strip composed of a matrix formed from a mixture of a polymer and of a filler that is made of an electrical conductor, a hydrophilic layer for collecting particles, on which layer is deposited said matrix so as to form at least one composite layer, the membrane including at least one region obtained via a surface treatment of the hydrophilic layer.

20 Claims, 4 Drawing Sheets

(56) References Cited

U.S. PATENT DOCUMENTS

| | | | | |
|---|---|---|---|---|
| 6,783,711 | B2 * | 8/2004 | Kurth | B01D 69/1251<br>427/244 |
| 6,837,996 | B2 * | 1/2005 | Kurth | B01D 71/69<br>210/488 |
| 11,524,304 | B2 * | 12/2022 | Metzger | B03C 3/70 |
| 2001/0021534 | A1 * | 9/2001 | Wohlstadter | G01N 33/585<br>436/524 |
| 2003/0127393 | A1 * | 7/2003 | Tepper | B01J 20/08<br>436/178 |
| 2003/0141242 | A1 * | 7/2003 | Kurth | B01D 71/69<br>210/500.41 |
| 2003/0217642 | A1 * | 11/2003 | Pasic | B03C 3/16<br>96/75 |
| 2003/0222012 | A1 * | 12/2003 | Lee | B82Y 30/00<br>422/534 |
| 2004/0007521 | A1 * | 1/2004 | Kurth | C22B 15/0089<br>210/488 |
| 2004/0035782 | A1 * | 2/2004 | Muller | B01D 71/34<br>210/500.21 |
| 2005/0034990 | A1 * | 2/2005 | Crooks | B82Y 30/00<br>204/600 |
| 2005/0072917 | A1 | 4/2005 | Becker | |
| 2006/0172340 | A1 | 8/2006 | Wohlstadter et al. | |
| 2007/0176093 | A1 * | 8/2007 | Kukla | B01L 3/5088<br>250/288 |
| 2009/0078640 | A1 * | 3/2009 | Chu | B01D 71/10<br>210/490 |
| 2010/0133098 | A1 * | 6/2010 | Hafeman | G01N 27/44756<br>204/403.01 |
| 2010/0224555 | A1 * | 9/2010 | Hoek | B01D 69/14111<br>427/322 |
| 2014/0116944 | A1 * | 5/2014 | Hu | B01D 67/0048<br>96/12 |
| 2016/0195488 | A1 * | 7/2016 | Ensor | G01N 27/227<br>422/69 |
| 2017/0234781 | A1 * | 8/2017 | Prisbrey | C12N 13/00<br>435/173.9 |
| 2017/0291143 | A1 * | 10/2017 | Zhou | B01D 69/1216 |
| 2020/0166494 | A1 * | 5/2020 | Ensor | G01N 27/227 |
| 2020/0398229 | A1 * | 12/2020 | Ho | B01D 71/82 |

FOREIGN PATENT DOCUMENTS

| | | | | |
|---|---|---|---|---|
| JP | 4943607 | B2 * | 5/2012 | B01D 46/0036 |
| WO | WO-9920378 | A1 * | 4/1999 | B01D 69/125 |
| WO | WO-2015085054 | A1 * | 6/2015 | B03C 3/76 |
| WO | WO-2019195196 | A1 * | 10/2019 | B03C 5/026 |

* cited by examiner

MEMBRANE FOR COLLECTING AIRBORNE PARTICLES

TECHNICAL FIELD OF THE INVENTION

The present invention relates to a membrane for collecting airborne particles.

PRIOR ART

A number of solutions for collecting particles present in an aerosol, with the aim of analysing these particles, have already been proposed in the prior art.

One known and particularly advantageous separating method is electrostatic. It is implemented in electrostatic precipitators (ESPs), which are also called electrostatic filters.

There are a number of categories of electrostatic precipitators, among which:

- so-called dry electrostatic precipitators, which are for example described in patent application WO2015/197747A1,
- so-called wet electrostatic precipitators, which are for example described in patent application WO2004/041440A1,
- so-called semi-wet electrostatic precipitators, which are for example described in patent application WO2007/012447A1.

In all these categories, the precipitators comprise a chamber into which is injected or sucked an air stream containing the particles, and generate an electric field between two electrodes: a discharge electrode and a counter-electrode that is called the collecting electrode, which is in general connected to ground. The electric field created between the two electrodes generates a flux of ions from an ionized pocket of gas encircling the discharge electrode. The air stream containing the particles is injected through the flux of ions. In the presence of ions, the particles acquire an electric charge and thus become sensitive to the electric field generated between the two electrodes and are driven by electric force towards the counter-electrode.

In the first category of electrostatic precipitators (so-called dry electrostatic precipitators), the collected particles are detached from the collecting electrodes using a dry process, for example one employing vibration of the electrodes or even mechanical brushes brushed over the surface of the latter.

In the second category of electrostatic precipitators (so-called wet electrostatic precipitators), the particles captured on the collecting electrodes are removed by trickling water onto the latter.

In the third category of electrostatic precipitators (so-called semi-wet electrostatic precipitators), water vapour is introduced into the chamber containing the discharge electrode or upstream thereof. The particles in suspension in the air then cross via heterogeneous nucleation to form droplets and said droplets are precipitated on the counter-electrode via the electric force. The introduced vapour may furthermore condense on the walls and then trickle over the collecting electrode, which contributes to the removal of the captured particles.

The publication referenced "Hyeong Rae Kim, Sanggwon An, and Jungho Hwang, *Aerosol-to-Hydrosol Sampling and Simultaneous Enrichment of Airborne Bacteria For Rapid Biosensing, ACS Sens.* 2020, 5, 2763-2771" describes a wet electrostatic precipitator intended to collect bio-particles from an air stream. The air stream is injected into a channel and passes between two electrodes. The particles are attracted towards the collecting electrode. A liquid is continuously injected to elute the particles captured on the collecting electrode. This solution, which belongs to the category of so-called wet electrostatic precipitators, notably requires a continuous flow of liquid to elute the particles present on the collecting electrode, this meaning that the solution is not easily adaptable to use in an instrument borne by or deployed with a drone for example. Specifically there is a risk, in operation, of the elution liquid dispersing and flowing into the air channel if the device is tilted or indeed if there are any vibrations. The liquid could also form a bridge between the electrodes if the device were flipped, short-circuiting the two electrodes. The same problem generally arises with all wet and semi-wet electrostatic precipitators, as for example in the technical solutions described in the aforementioned patents WO2004/041440A1 and WO2007/012447A1.

In patent application EP4015087A1, it has been proposed to use a hydrophilic collecting membrane. Because of its hydrophilic nature, the membrane is capable of soaking up a liquid by capillarity and thus avoids the risk of dispersion of the liquid if the device is tilted or jolted during its operation. The membrane takes the form of a strip of flexible material. It is manufactured from a fibrous or cellular material, able to soak up a liquid. In this patent application, the membrane is made of a cellulose-based material (for example filter paper or the like) or of a material such as a woven of hydrophilic nature, a foam (sponge) or fibreglass. However, this membrane was not designed to also play the role of collecting electrode.

Patent EP1112124B1 for its part describes a collecting membrane intended to be employed in a wet or dry electrostatic precipitator.

Patent EP1112124B1 describes an electrostatic precipitator based on the original use of a membrane made of interwoven fibres that may be made of ceramic, of metals or metal alloys, or of carbon. The technical solution is advantageous but employing it in an aerosol precipitator with a view to performing biological analyses would lead to a certain number of problems. Specifically, all the employed materials must meet criteria of compatibility with the various biological analysis techniques, making selection thereof non-trivial.

Many patents such as EP1112124B1 describe the use of metals or metal alloys. However, many metals inhibit biomolecular analyses. Aluminium for example inhibits this type of reaction. Moreover, it is recommendable to keep the microorganisms cultivatable with a view to using culturing to analyse them, but metals such as copper or silver have disinfectant properties. One advantageous solution is to use non-metal conductors such as carbon or such as polymers, which may be used if they are conductive and if their components do not interfere with the reactions of the biological analyses. Materials based on PEDOT for example are advantageous conductive polymers and have often been described in the literature, but using them in biological analyses is not a trivial task. Specifically, the solvents employed to prepare them must be removed using specific processes for them to be usable in a precipitator intended for biological analyses. Lastly, materials based on carbon and conductive polymers are hydrophobic and thus do not meet the requirement of hydrophilicity, which must be met if the solution used to rinse the membrane is to penetrate the latter correctly. The silicone matrix described in patent EP1112124B1 is also hydrophobic in nature. Although rinsing with water is always one possible way of cleaning the membrane, whether the material from which it is made is hydrophilic or not, in the context of biological analyses the amount of water required is a problem. Specifically, in this context of use, the volumes employed must be minimized and if possible be smaller than 5 ml with a preferred volume smaller than 300 μl/cm$^2$. In addition, if the membrane is hydrophobic, rinsing will be less effective because of surface interactions between the hydrophobic layer and the collected particles. A surface treatment must therefore be applied to materials such as these, which treatment must also be compatible with any subsequent analyses that might be carried out on the collected sample.

There is an additional problem with the methods described in patents US20040083790A1, US20080295687A1 and US20100000540A1, which are based on wet or semi-wet electrostatic precipitators, as the oxidizing molecules formed by the electric discharges employed in the precipitating process cause, in the presence of water, dissolved hydrogen peroxide to form (J-M. Roux, A. Rongier, D. Jary, *Importance of the substrate nature to preserve microorganisms' cultivability in electrostatic air samplers, Journal of Physics: Conference Series,* 646(1), (2015), 012039). Specifically, hydrogen peroxide is a power oxidant that kills any collected microorganism, preventing culturing from being used to analyse them, even when it is a question of bacterial spores, these however being among the most resistant of microorganisms. In addition, hydrogen peroxide is a relatively stable compound that risks inhibiting the biochemical reactions employed in the analyses.

The aim of the invention is to provide a solution of membrane form, capable both of playing the role of electrode for precipitating the airborne particles and the role of elution medium, while not inhibiting any biochemical reactions that might be employed to analyse the bioaerosols. The solution should be able to participate in precipitation of the particles and to elution thereof with a view to analysis, a recovery rate higher than 50% and a high particle concentration in the eluted liquid being achieved.

Specifically, in the context of electrostatic precipitation and of elution integrated into the same component, such a membrane must perform a key function, namely ensuring the particles are transferred from air to liquid, to guarantee that the rest of the analysis chain will operate as it should.

SUMMARY OF THE INVENTION

This aim is achieved via a membrane for collecting airborne particles, said membrane taking the form of a strip composed of:

- a matrix formed from a mixture of a polymer and of a filler that is made of an electrical conductor,
- a hydrophilic layer for collecting particles, on which layer is deposited said matrix so as to form at least one composite layer,
- said membrane comprising at least one region obtained via a surface treatment of said hydrophilic layer.

According to one particular embodiment, the hydrophilic layer is based on cellulose.

According to another particular embodiment, the hydrophilic layer is based on a woven.

According to one particularity, the hydrophilic layer is based on a material that holds by capillarity a volume smaller than 30 μl/cm$^2$.

According to one particularity, the matrix is made from a silicone-based material.

According to one particular embodiment, the filler takes the form of a carbon powder, mixed with said matrix.

According to another particular embodiment, the filler takes the form of a graphite powder.

According to one particular embodiment, the hydrophilic layer has a total area and comprises at least a first region, referred to as the collection region, obtained via said surface treatment in a first portion of its total area and at least a second region produced in a second portion of its total area, the first layer having a first thickness in its collection region and a second thickness in its second region, said first thickness being smaller than the second thickness.

According to one particularity, the hydrophilic layer is treated to form an electrical contact-redistribution region of area smaller than its total area, said region being obtained via said surface treatment of said hydrophilic layer over a thickness equal to its total thickness.

According to another particularity, the second region is a region referred to as the wetting region, which is more hydrophilic than the collection first region.

According to another particularity, the wetting region is produced without surface treatment of said hydrophilic layer.

According to another particularity, the membrane comprises a hydrophobic barrier region between the contact-redistribution region and the wetting region.

According to another particularity, the hydrophobic barrier region takes the form of a deposit of paraffin wax.

According to another embodiment, the membrane comprises another region, referred to as the end region, which is located opposite the wetting region with respect to the collection region and is obtained without surface treatment of the hydrophilic layer.

According to another particularity, the membrane comprises a hydrosoluble layer deposited on the hydrophilic layer.

The invention also relates to a process for manufacturing the collecting membrane such as defined above, the process comprising steps of:

- forming a carrier formed from said hydrophilic layer,
- depositing on said carrier the matrix formed from a mixture of the polymer and of the filler made of electrical conductor,
- polymerizing the polymer,
- carrying out a surface treatment on the hydrophilic layer, in order to form said region.

The invention also relates to an electrostatic precipitator of airborne particles, comprising a collecting unit, and precipitating means configured to force said airborne particles towards said collecting unit, the collecting unit incorporating a collecting membrane such as defined above.

According to one particularity, the electrostatic precipitator comprises a fluidic circuit for eluting the airborne particles collected by the collecting membrane, said eluting fluidic circuit comprising at least one fluidic channel that opens onto said collecting membrane.

According to one particularity, the electrostatic precipitator comprises a component in which is produced a channel for collecting the particles and the collecting membrane is arranged to carpet at least partially said collecting channel.

According to another particularity, the collecting membrane comprises:

- at least a first region, referred to as the collection region, obtained via said surface treatment in a first portion of its total area,
- at least a second region, referred to as the wetting region, which is more hydrophilic than the collection first region, an electrical contact-redistribution region obtained via said surface treatment of said hydrophilic layer over a thickness equal to its total thickness, a region, referred to as the end region, which is located opposite the wetting region with respect to the collection region, the collecting membrane being compressed partially in its wetting region and in its end region between two plates of the component, which plates are joined to each other to form said collecting channel.

In the invention, the absence of water during the capture of the airborne particles guarantees the absence of persistent chemical compounds ($H_2O_2$, etc.) that could inhibit any biological analysis reactions that might be employed. It is therefore preferable to employ a dry precipitating method, and to find a way of efficiently detaching the particles collected by the collecting medium. Specifically, the electrostatic precipitation causes the particles to adhere strongly to the collecting electrodes and hence, in the absence of continuous running water, the electrodes must be rubbed or scraped mechanically as described in patent EP1112124B1. This rubbing or scraping step is difficult to integrate.

BRIEF DESCRIPTION OF THE FIGURES

Other features and advantages will become apparent from the detailed description, which is given with reference to the appended drawings, in which.

DETAILED DESCRIPTION OF AT LEAST ONE EMBODIMENT

The invention relates to a collecting membrane M intended to be employed in an electrostatic precipitator 1 of airborne particles P.

The particles P may be micro-particles or nano-particles present in the air in aerosol form.

Non-limitingly, the particles P may notably be collected from ambient air or from air exhaled by a living being. In the rest of the description, the particles in question are collected from ambient air.

One of the objectives is to analyse the particles P with a view to detecting the presence of a pathogenic agent or a trace of its presence, via analysis of the collected particles.

The sought pathogenic agents may be, inter alia, microorganisms such as viruses, bacteria, fungal spores, toxins, mycotoxins, allergens, or any other harmful agent.

The particles are advantageously collected with the aim of analysis. The analysis may consist in detecting the presence: of DNA; of RNA; of proteins; of component elements of the pathogenic agent, such as lipids or carbohydrates; of one or more pathogenic agents present in the collected particles. The analysis may also consist in detecting molecules such as ATP or even sugars such as mannitol, arabitol and glucose, which provide information on the presence of microorganisms. The analysis may also regard detection of molecules such as allergens and mycotoxins.

By way of example, the analysing method may be a biomolecular-amplification method (for example LAMP, RPA, PCR, etc.), or an immuno-enzymatic method (for example ELISA).

The precipitator will possibly, notably, be employed in the form of an area monitor. To be so employed, it will then need to have a certain autonomy in operation, i.e. to be able to collect and analyse the particles with a minimum of exterior intervention, and notably without handling between the collecting phase and the analysing phase.

Figure 1:
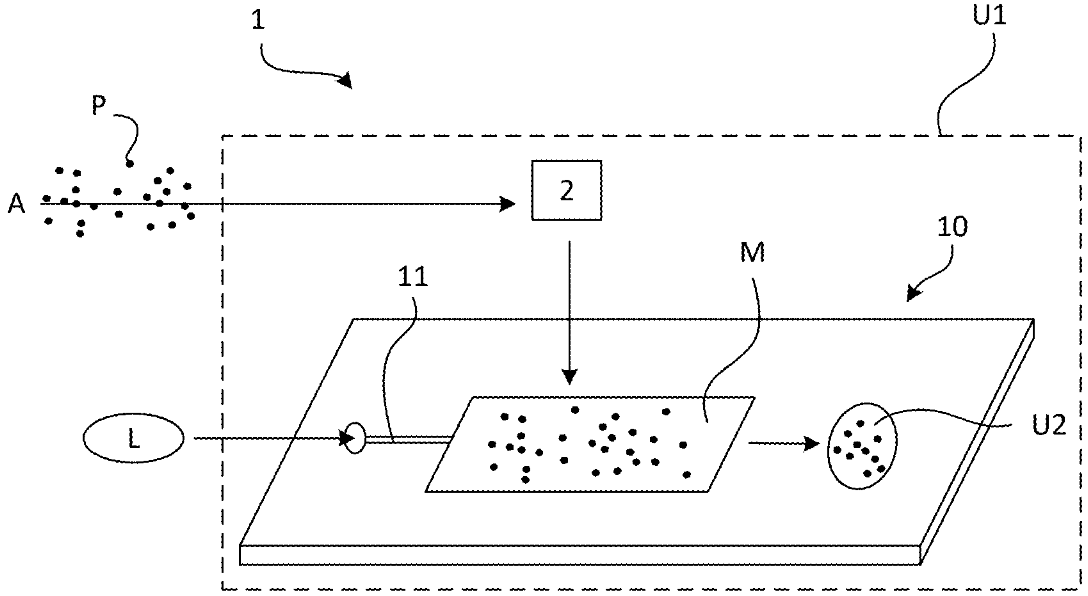
FIG. 1 gives an idea of how an electrostatic precipitator using a collecting membrane according to the invention operates.

FIG. 1 gives an idea of how an electrostatic precipitator 1 employing a collecting membrane M such as that of the invention operates.

The precipitator may incorporate a particle-collecting unit U1 and a unit U2 for analysing the collected particles. The architecture described below and shown in FIG. 1 is non-limiting.

The particle-collecting unit U1 comprises a main collecting component 10.

By way of example, the collecting component 10 may be made of a material such as COP/COC (cyclic olefin polymer/cyclic olefin copolymer), polycarbonate or PMMA (polymethyl methacrylate). It may notably be sufficiently transparent to be read optically when the analysis is performed directly in the analysing unit U2 of the component 10.

The component 10 works via the electrostatic effect. It comprises two electrodes: a discharge electrode, and a counter-electrode that is called the collecting electrode, and which is in general connected to ground. The two electrodes are each connected to a separate terminal of an electrical power source and are spaced apart from each other so as to create a sufficient electrostatic field to attract the airborne particles towards the collecting electrode, in order that they may be captured and trapped on this collecting electrode.

The collecting electrode is formed by the collecting membrane M of the invention.

The collecting unit U1 is arranged on a dedicated wall of the component 10 and bears the collecting membrane M of the invention, with a view to collecting the particles P.

The component 10 may notably comprise a chamber into which is injected or sucked an air stream containing the particles. Precipitating means 2, which may generate the air stream, are configured to direct the particles present in the air towards the collecting membrane M. The component 10 may notably comprise an internal collecting channel through which the air to be analysed flows. The flow of air through the channel may be forced (for example using a fan) or not. The collecting membrane M is arranged to carpet at least partially the internal surface of the collecting channel, so that the particles present in the air stream injected into the channel may be exposed to the created electrostatic field.

The component 10 may advantageously incorporate a fluidic circuit, referred to as the eluting fluidic circuit. This eluting fluidic circuit advantageously comprises a first fluidic channel 11 that opens onto the collecting membrane M, with a view to being able to pour elution liquid L onto the membrane.

The eluting fluidic circuit may also comprise a container for receiving the elution liquid L soaked up by the membrane M and transporting the particles P.

The elution liquid L is for example water.

By capillarity, the liquid L wets the entire extent of the membrane M and entrains with it the particles collected beforehand.

The unit U2 for analysing the collected particles P may be located in the component 10 employed for the collection, as shown in FIG. 1, or be separate therefrom. It is advantageously located in the component 10 so as to decrease the hardware that an operator has to interact with and so as to allow the process to be automated. The analysing unit U2 may comprise a detection chamber produced in the component 10 and intended to receive the collected sample after elution. This detection chamber may be formed directly by the container for receiving the liquid L after elution. This detection chamber may contain reagents required for the analysis, and for example to achieve a biomolecular amplification reaction.

As mentioned above, the analysis may be carried out via biomolecular amplification or be an immuno-enzymatic analysis (e.g. ELISA) or be an immunochromatographic analysis (e.g. LFA).

An analysis via biomolecular amplification of microorganisms assumes extraction of genomic material from the microorganisms. Three technical solutions may be employed:

- Entraining the microorganisms with a first liquid solution that wets the collecting membrane, collecting this solution containing the particles in a reservoir or a receptacle chamber then lysing them mechanically or thermally or chemically therein or in another chamber of the device.
- Wetting the membrane with a liquid chemical-lysis solution that extracts genetic material from the microorganisms chemically. This liquid solution will furthermore entrain the genetic material of interest and the latter will be collected in a reservoir or a receptacle chamber.
- Heating the membrane to a temperature suitable for lysis of the sought microorganisms (for example, 65° C. for 5 minutes). The genetic material may then be eluted subsequently, to a reservoir or a receptacle chamber.

According to the invention, the collecting membrane M is designed to play:

- the role of collecting electrode,
- the role of medium for collecting the airborne particles P and trapping the airborne particles;
- the role of elution medium in order to facilitate collection of the particles P precipitated with a view to analysis thereof, without running the risk of dispersion of the liquid if the device is tilted or if it is shaken or even if it is vibrated.

The membrane M is also designed with materials that are compatible with the analysis reactions able to be employed and listed above.

By membrane, what is meant is a strip composed of one or more layers of material having a small thickness (a few microns to a few millimetres) with respect to its length and its width.

According to the invention, the membrane M takes a composite form, based on:

- a hydrophilic layer 3 for collecting the particles;
- a matrix 40 formed from a mixture of a polymer and of a filler 41 that is made of an electrical conductor.

By hydrophilic nature, what is meant is that the hydrophilic layer 3 is capable of soaking up a liquid L, for example a liquid such as water, by capillarity. It will be recalled that the wettability of a material is determined by observing the contact angle (most often denoted a) that the latter makes to a drop of water:

- when this angle (i.e. the contact angle) is smaller than 90°, the surface is said to be relatively hydrophilic (the area of contact between the water and the material is large);
- when it is larger than 90°, the surface is said to be relatively hydrophobic (the area of contact between the water and the material is small).

In the case of the invention, by hydrophilic nature, what is meant is that the hydrophilic layer advantageously has a contact angle smaller than 75° after a very small amount of time shorter than a few seconds, 5 seconds for example. Moreover, in the collection region of the membrane, this contact angle then decreases very rapidly to below 50°, water penetrating into the material very rapidly. It is therefore very hydrophilic in nature.

Figure 2:
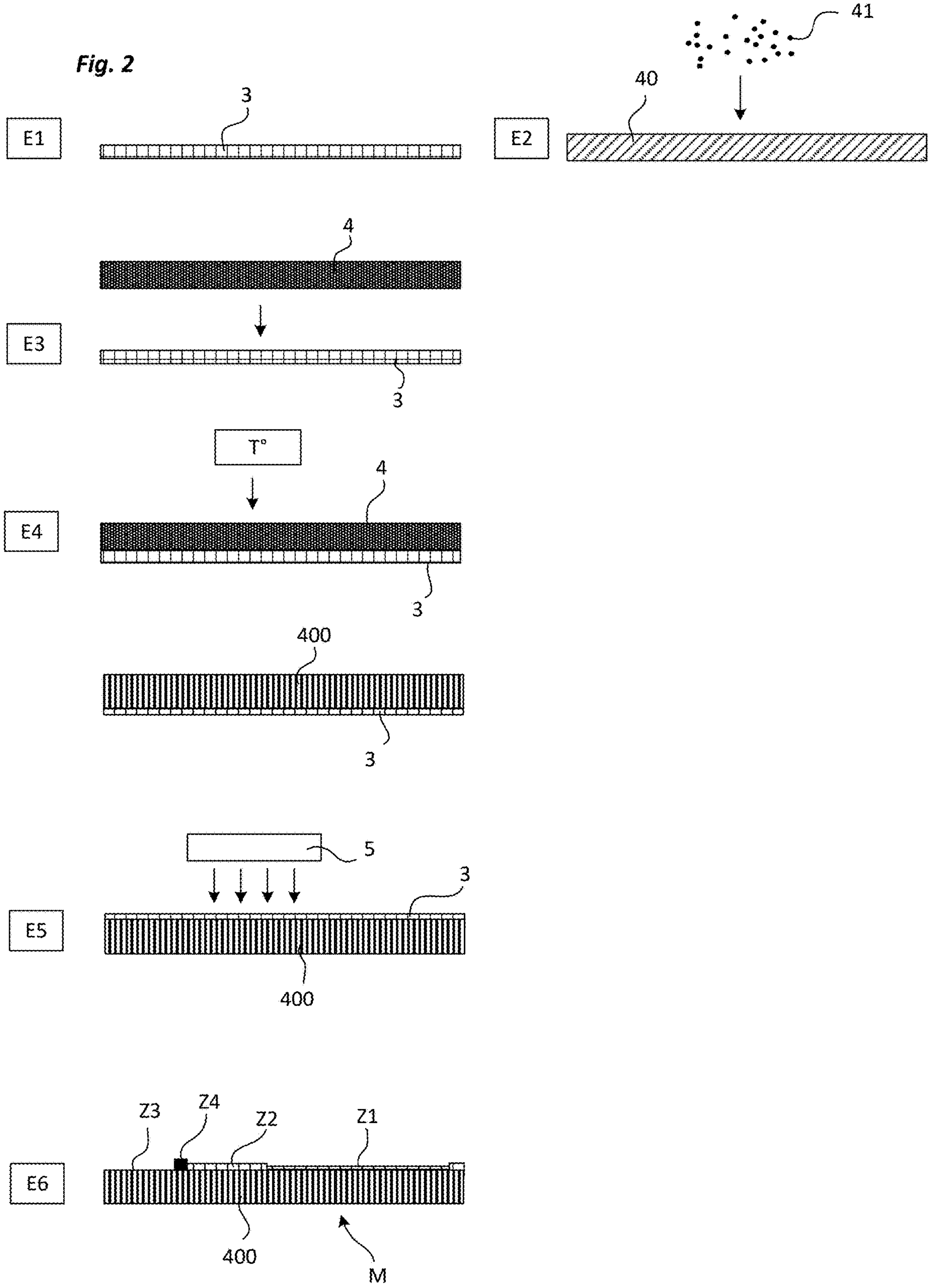
FIG. 2 gives an idea of how the collecting membrane of the invention is manufactured.

Non-limitingly, the various steps of manufacture of the membrane are illustrated in FIG. 2 and described below.

Step E1: The hydrophilic layer 3 is employed as carrier for the matrix 40 in the manufacturing process.

The hydrophilic layer 3 advantageously comprises interwoven fibres, said fibres defining therebetween gaps through which the liquid may flow during the elution.

Advantageously, the hydrophilic layer 3 may be manufactured from a fibrous or cellular material, able to soak up a liquid such as water. By way of example, it may be made of a cellulose-based material (for example filter paper or the like) or of a material such as a woven of hydrophilic nature, such as a foam (sponge) or such as fibreglass.

By way of example, the hydrophilic layer 3 is for example composed of Whatman® filter paper.

So as to minimize the volumes employed and thus increase the concentration in solution of the collected and eluted particles, the thickness of the membrane is chosen so as to retain by capillarity a volume smaller than 30 $\mu l/cm^2$.

Step E2: A second layer 4 is manufactured. This second layer 4 is composed of a mixture of a polymer matrix 40 and of a filler 41 that is made of an electrical conductor. The filler 41 is added to the matrix in order to make the membrane conductive.

Non-limitingly, the matrix 40 may be based on silicone and the filter 41 may be carbon powder. Carbon, silicone and the pair consisting of carbon and silicone together have the advantage of being inert with respect to biochemical reactions. The composite formed is therefore not liable to inhibit these reactions. Of course, other materials having such properties with respect to biochemical reactions could be envisaged.

Advantageously, carbon in graphite form is added to the silicone matrix in a percentage by weight comprised between 30% and 50%. The concentration of filler must be chosen to be high enough that a good electrical conductivity is obtained, without decreasing the mechanical strength of the obtained material and especially take up of the powder by the matrix (which is for example based on silicone).

This second layer is liquid, pasty and viscous in form, making it easier to shape and deposit before polymerization.

Step E3: The second layer 4 is deposited on the hydrophilic layer 3, which is for example formed from paper (see above). It will be noted that the hydrophilic layer 3 is advantageously chosen to have a sufficiently rough and/or porous surface, in order to better adhere to the mixture.

Advantageously, the second layer 4 is deposited on the first layer 3 with a constant thickness over the entirety of the first layer 3.

Step E4: The multilayer assembly is then placed under conditions such as to polymerize the matrix (T°). For example, in the case of a membrane based on silicone, the multilayer assembly may be heated to 60° C. for 3 hours.

During the polymerization, the second layer 4 impregnates the hydrophilic layer 3, forming the composite 400. As may be seen in FIG. 2, a thin hydrophilic layer 3 remains at the surface.

If the thickness of the remaining hydrophilic first layer 3 is small enough, typically smaller than 100 μm, the membrane M may be used as such in a precipitator. The layer 3, which is hydrophilic, is placed in the precipitator in contact with the air and on the path of the air stream, and therefore on the path of the particles P to be collected. The particles will be attracted by the biased conductive layer 4 and deposit on the hydrophilic layer 3 of the membrane M via which they will be captured, optionally inside the first layer if the latter has a sufficient porosity.

If the hydrophilic layer 3 possesses a three-dimensional structure (thus forming cells and a sufficiently porous layer), as in the case for example of paper, the liquid L used to elute the collected particles P will penetrate the whole of the thickness of the hydrophilic layer 3. This “bulk capillarity” is a much better way of guiding the liquid L throughout the medium. All of the captured particles P are thus entrained by the elution liquid L, increasing elution efficiency. The liquid containing the particles may be collected in a dedicated container placed downstream.

The elution liquid L is advantageously water. It may advantageously contain a surfactant such as for example TritonX100 and proteins such as for example BSA or casein in order to increase the wetting of the membrane, to block protein/surface interactions and to increase the efficiency of collection of the collected particles.

It is also possible for the remaining layer 3 to have too large a thickness, and for it thus to limit collection efficiency. In this case, advantageously, a step of manufacture of the membrane M consists in creating one or more regions on the membrane, by treatment of the hydrophilic layer.

Step E5: The surface treatment may consist of an etch of the hydrophilic layer 3 still present (etching means 5), for example by laser, milling or even through creation of regions using barriers made for example of paraffin wax. The etching operations may etch a greater or lesser proportion of the total thickness of the hydrophilic layer, in order to allow one or more regions to be defined.

Step E6: The membrane M is obtained with for example various distinct regions.

Figure 3:
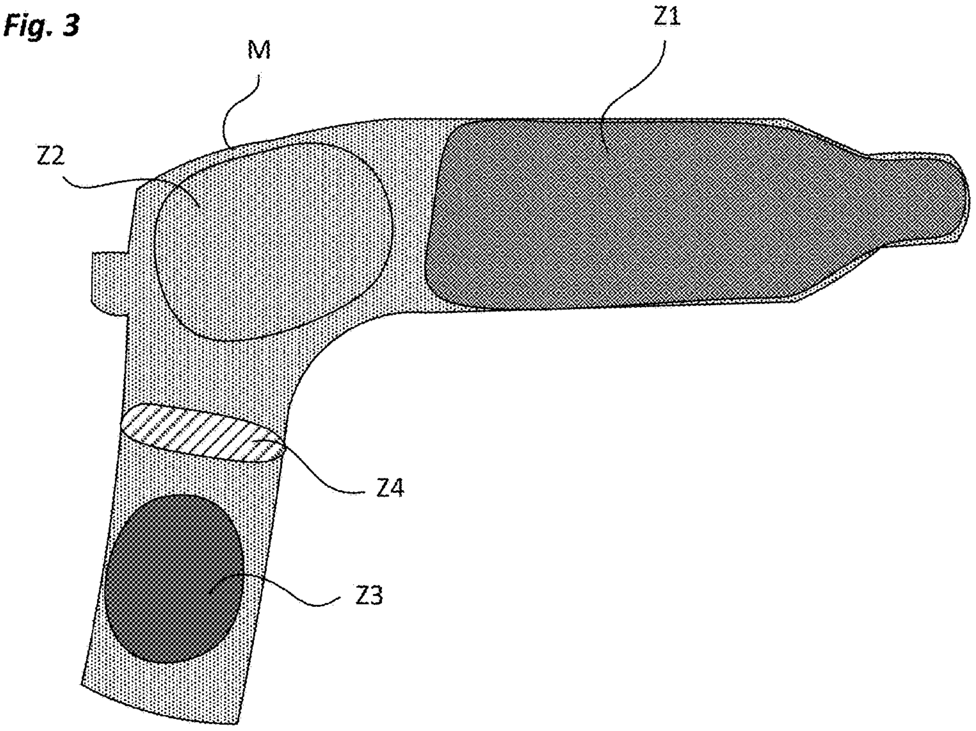
FIG. 3 shows a top view of the collecting membrane, according to a first variant of embodiment.
Figure 4:
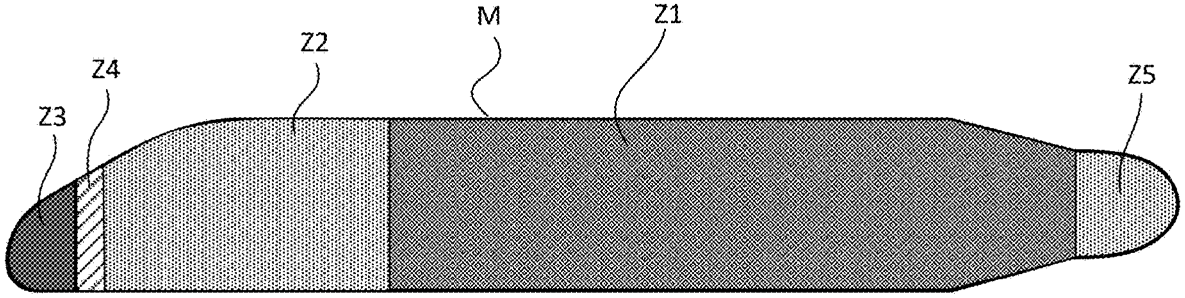
FIG. 4 shows a top view of the collecting membrane, according to a second variant of embodiment.

These various obtained regions are for example shown in FIG. 3 and in FIG. 4:

- a region, referred to as the collection region Z1, in which the hydrophilic layer 3 is partially etched;
- a region, referred to as the wetting region Z2, in which the hydrophilic layer 3 is not etched, or etched to a smaller depth than it is in the collection region Z1.

Advantageously, it is also possible to create on the membrane M:

- a contact-redistribution region Z3, in which the entire thickness of the hydrophilic layer 3 is removed, so as to allow access to the second layer 4 located below;
- one or more barrier regions Z4, arranged between the wetting region Z2 and the contact-redistribution region Z3 to guide the elution liquid L and prevent the latter from migrating toward the contact region Z3;
- an end region Z5, through which the soaked-up liquid leaves the membrane on its way to the analysing unit U2. In this region Z5, the hydrophilic layer 3 is advantageously not etched. It therefore possesses a good porosity.

The various regions may be produced on the same membrane M and occupy all or some of the total area of the membrane M. The collection region Z1 may especially be of relatively large extent.

The collection region Z1 is obtained by etching the hydrophilic layer 3 to a depth smaller than its total thickness, with a view to obtaining a region providing a compromise between wettability characteristics and the quality of capture of the particles P via electrostatic forces.

The wetting region Z2 is the region through which the elution liquid L is introduced with a view to collection of the precipitated particles P. It makes it possible to ensure distribution of the elution front over the entire width of the membrane, avoiding preferential flow paths, and a regular flow of the elution liquid L. By capillarity, the liquid L introduced through the wetting region Z2 wets the entire area of the membrane M, at least in its collection region Z1, and entrains with it the particles collected beforehand. The liquid L carries off the particles P and is advantageously collected in a dedicated container.

The contact-redistribution region Z3 may also be employed as a region of confinement of the elution liquid L, the second layer 4 being hydrophobic.

Each barrier region Z4 may be formed by depositing a layer of paraffin wax on the surface of the membrane M. A barrier region is configured to act as a barrier to the liquid L between two distinct regions of the membrane.

The end region Z5 is intended to:

- slow the flow of fluid exiting the region Z1 of the membrane;
- force the liquid to flow without preferential path and in film form;
- serve as region via which the membrane may be held in its housing.

It is also possible to add, to the hydrophilic layer 3, whether it is etched or not, a hydrosoluble agent intended to promote elution of the collected particles. By way of example, the hydrophilic layer, in its collection region Z1, may be treated with a solution composed of a sugar such as lactose, trehalose or even saccharose that, on dissolving during elution, facilitates the entrainment of the particles collected by the elution liquid L.

The obtained final membrane M may be cut to the desired dimensions, in order to match the geometry of the electrostatic precipitator.

FIG. 3 shows a first example of embodiment in which the collecting membrane M takes the form of a sock. In this embodiment, the membrane M does not comprise the end region Z5. The other regions Z1 to Z4 are produced on the membrane in the way described above.

FIG. 4 shows another example of embodiment, in which the collecting membrane M has a shape that is elongate along a longitudinal axis. The various regions are juxtaposed along the axis of the membrane. The membrane M is configured so as to have the region Z3 at a first end. The latter is followed by the region Z4 forming the barrier region. The region Z4 is followed by the region Z2, which corresponds to the wetting region through which the elution liquid is introduced. The region Z2 is followed by the region Z1, which is intended to collect particles. The membrane ends at its other end with the region Z5.

Figure 5A:
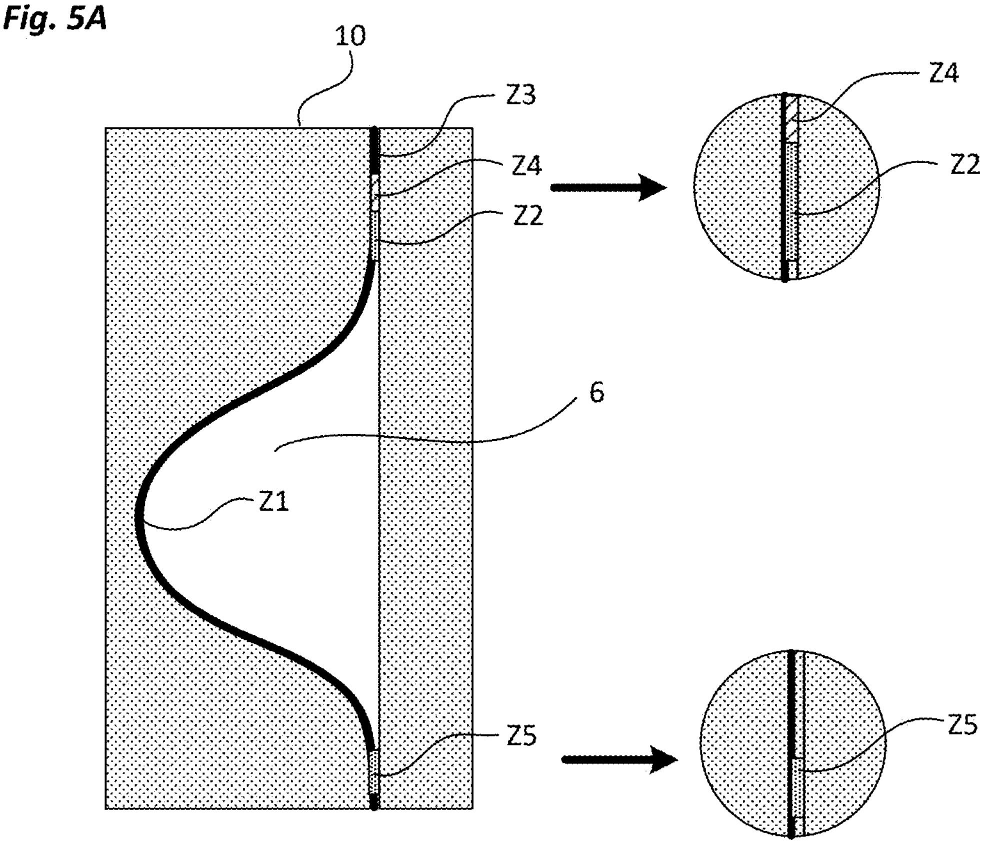
FIG. 5A gives an idea of how the collecting membrane of FIG. 4 is positioned in an electrostatic precipitator.

FIG. 5A gives an idea of how the collecting membrane M is placed in its housing. It is thus held between two plates of the component 10, and at least partially carpets the cross section of the collecting channel 6 formed by joining the two plates.

The membrane is held by compression on one side of its regions Z3, Z4 and Z2 and on the opposite side by compression of its region Z5. The collection region Z1 is then arranged to closely follow the shape of a recessed surface of the channel 6.

In the region Z2 and in the region Z5, through which regions the liquid is required to flow, the compression is partial so as not to block the flow, while nonetheless forming an obstacle that constrains the flowing liquid to pass through these two regions of migration in the form of a film of a set thickness. This configuration prevents any risk of trickling along preferential paths notably on entry (into the region Z2), where the liquid arrives under pressure.

These regions Z2 and Z5 also increase mechanical robustness by pressing the membrane into the right position, in the areas where the ends have a tendency to lift with respect to the component.

Figure 5B:
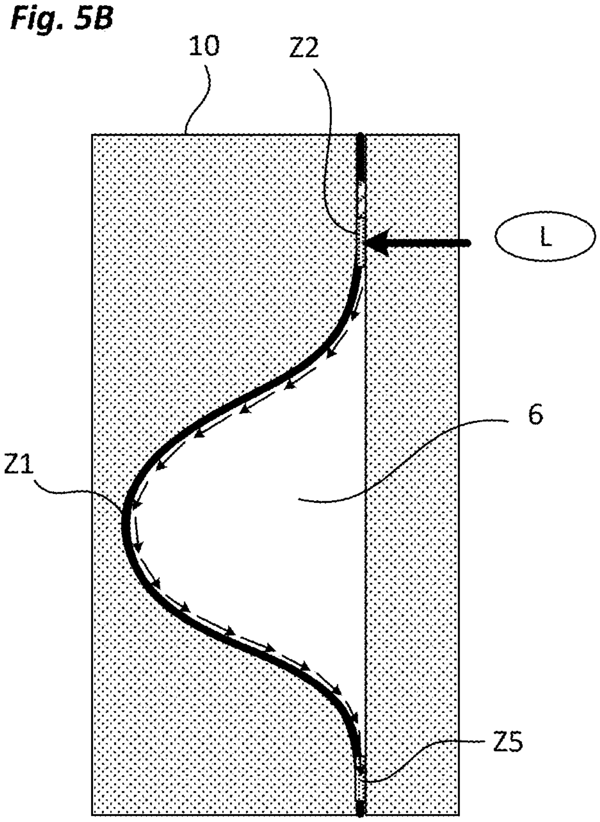
FIG. 5B gives an idea of how liquid flows through the membrane, in its arrangement of FIG. 5A.

FIG. 5B gives an idea of how the liquid flows through the membrane, during elution of the collected particles. It may be seen that the adjusted compression of the membrane in the region Z2 assists with creation of a capillary film that then flows to the region Z5. The adjusted compression of the region Z5 allows a regular flow to be created exit side, and prevents the formation of droplets.

It will be noted that inhibition tests have been carried out to confirm the compatibility of the invention with biomolecular reactions. To this end, samples of membranes made of Whatman filter paper, graphite powder and silicone were brought into contact with a reaction mix. This mix was then sampled, and a biomolecular amplification reaction carried out. The results revealed a slight delay in appearance with respect to controls but an excellent reproducibility of the results, independently of the ageing state of the membrane. The type of membrane proposed therefore does not seem to lead to inhibition of the biomolecular reaction.

The membrane M of the invention is thus able to ensure collection of airborne particles P and elution thereof. It also has the following features and advantages:

- it allows a high rate of recovery of particles P after elution, by virtue notably of a high degree of wettability and of the presence of small unused volumes;
- it is compatible with biological reagents, thus allowing biochemical reactions to be implemented (for example polymerase chain reaction (PCR), LAMP or the like);
- the membrane M has a size comparable to the characteristic dimensions of the air channel, ensuring efficient collection without extra flow or an electrode of complex geometry being required;
- the membrane M is suitable for implementation of dry precipitation;
- it has a good mechanical strength;
- it is flexible enough to be inserted into electrostatic precipitators of various shapes;
- it is easy to produce and to shape, notably with edges designed not to cause a tip effect.

The invention claimed is:

1. A membrane for collecting airborne particles, wherein the membrane includes a strip composed of:
- a matrix formed from a mixture of a polymer and of a filler that is made of an electrical conductor, and
- a hydrophilic layer for collecting particles, on which is deposited said matrix so as to form at least one composite layer,
- said membrane comprising at least one region obtained via a surface treatment of said hydrophilic layer,
- wherein the hydrophilic layer has a total area and comprises at least a first region, referred to as a collection region, obtained via said surface treatment in a first portion of the total area and at least a second region produced in a second portion of the total area, the hydrophilic laver having a first thickness in the collection region and a second thickness in the second region, the first thickness being smaller than the second thickness.

2. The membrane according to claim 1, wherein the hydrophilic layer is based on cellulose.

3. The membrane according to claim 1, wherein the hydrophilic layer is based on a woven material.

4. The membrane according to claim 1, wherein the hydrophilic layer is based on a material that holds by capillarity a volume smaller than 30 $\mu l/cm^2$.

5. The membrane according to claim 1, wherein the matrix is made from a silicone-based material.

6. The membrane according to claim 1, wherein the filler includes a carbon powder, mixed with said matrix.

7. The membrane according to claim 1, wherein the filler includes a graphite powder.

8. The membrane according to claim 1, wherein the hydrophilic layer is treated to form an electrical contact-redistribution region of area smaller than the total area, said region being obtained via said surface treatment of said hydrophilic layer over a thickness equal to a total thickness of the hydrophilic layer.

9. The membrane according to claim 8, wherein the second region comprises a wetting region, which is more hydrophilic than the collection first region.

10. The membrane according to claim 9, wherein the wetting region is produced without surface treatment of said hydrophilic layer.

11. The membrane according to claim 9, comprising a hydrophobic barrier region between the electrical contact-redistribution region and the wetting region.

12. The membrane according to claim 11, wherein the hydrophobic barrier region includes a deposit of paraffin wax.

13. The membrane according to claim 9, comprising another region, referred to as an end region, which is located opposite the wetting region with respect to the collection region and is obtained without surface treatment of the hydrophilic layer.

14. The membrane according to claim 1, comprising a hydrosoluble layer deposited on the hydrophilic layer.

15. A process for manufacturing the collecting membrane such as defined in claim 1, the process comprising the steps of:
- forming a carrier formed from said hydrophilic layer,
- depositing on said carrier the matrix formed from a mixture of the polymer and of the filler made of electrical conductor,
- polymerizing the polymer, and
- carrying out a surface treatment on the hydrophilic layer, in order to form said region.

16. An electrostatic precipitator of airborne particles, comprising a collecting unit, and precipitating means configured to force said airborne particles towards said collecting unit, wherein the collecting unit incorporates the membrane defined in claim 1.

17. The electrostatic precipitator according to claim 16, comprising a fluidic circuit for eluting the airborne particles collected by the collecting membrane, said eluting fluidic circuit comprising at least one fluidic channel that opens onto said collecting membrane.

18. The electrostatic precipitator according to claim 16, comprising a component with a channel for collecting the particles and wherein the collecting membrane is arranged to carpet at least partially said collecting channel.

19. The electrostatic precipitator according to claim 18, wherein the collecting membrane comprises:

at least a first region, referred to as a collection region, obtained via said surface treatment in a first portion of a total area of the collecting membrane, at least a second region, referred to as a wetting region, which is more hydrophilic than the collection region, an electrical contact-redistribution region obtained via said surface treatment of said hydrophilic layer over a thickness equal to a total thickness of the hydrophilic layer, and an end region which is located opposite the wetting region with respect to the collection region, the collecting membrane being compressed partially in the wetting region and in the end region between two plates of the component, which plates are joined to each other to form said collecting channel.

20. The membrane according to claim 1, wherein the region of the hydrophilic layer is an etched region.

* * * * *